United States Patent
Box

[11] 3,750,596
[45] Aug. 7, 1973

[54] INTERLOCKING STORAGE PALLET
[76] Inventor: Theodor M. Box, 1108 Aileen Rd., Brielle, N.J.
[22] Filed: Apr. 24, 1972
[21] Appl. No.: 246,668

Related U.S. Application Data
[63] Continuation-in-part of Ser. No. 191,932, Oct. 22, 1971.

[52] U.S. Cl. ................................. 108/43, 108/58
[51] Int. Cl. ............................................ B65d 19/38
[58] Field of Search ........................... 108/51, 58, 59

[56] References Cited
UNITED STATES PATENTS

| | | | |
|---|---|---|---|
| 3,404,642 | 10/1968 | Belcher et al. | 108/58 |
| 3,636,889 | 1/1972 | Mangold | 108/53 |
| 3,307,504 | 3/1967 | Cloyd et al. | 108/58 |
| 3,363,590 | 1/1968 | Cloyd et al. | 108/53 |
| 3,521,764 | 7/1970 | Loomis | 108/53 |
| 3,561,375 | 2/1971 | Hammond | 108/53 |
| 3,580,190 | 1/1970 | Fowler | 108/58 |
| 3,638,586 | 2/1972 | Eishou | 108/58 |
| 3,680,495 | 8/1972 | Pike | 108/53 |

Primary Examiner—Bernard A. Gelak
Assistant Examiner—Glenn O. Finch
Attorney—James H. Callahan, Robert T. Tobin et al.

[57] ABSTRACT

An interlocking storage pallet is disclosed comprised of two generally planar parallel load bearing surfaces, having passages for fork lift and pallet trucks between the two surfaces. The two surfaces are separated from but joined to each other by reinforcing columnar portions located at spaced positions therein. To permit vertical stacking of the empty pallets, protuberances are molded on the lower surfaces of the columnar portions and recesses are molded in the upper surfaces. When vertically stacked, the interlocking of the protuberances in the recesses prevents lateral relative displacement of adjacent pallets.

14 Claims, 4 Drawing Figures

INTERLOCKING STORAGE PALLET

This is a continuation-in-part of my copending application, Ser. No. 191,932, filed Oct. 22, 1971, entitled "A Plastic Pallet and Its Method of Manufacture."

BACKGROUND OF THE INVENTION

1. Field of the Invention

This invention relates to material handling pallets. More particularly, it relates to plastic pallet and fork lift truck pallets adapted to permit the vertical stacking of the pallets when empty.

2. Description of the Prior Art

Pallets for handling material have been known for some time. Previously, they generally were wooden pallets having flat upper and lower surfaces with suitable wooden spacing members between the two surfaces.

Recently, because of the inherent problems in the use of wooden pallets, such as breakage, weight and susceptibility to bacteria growth, various synthetic materials have been used in making pallets. One of the most popular materials is plastic. Because of the large size of the pallets, however, plastic pallets are generally difficult to mold and present problems in both designing and molding strong durable pallets. For example, one problem frequently encountered is to adapt the pallets for use with both fork lift and pallet trucks. This requires two openings on each of the four sides of the pallet with a passage through the pallet connecting the openings on one side with those on the opposite side. To meet this design requirement portions of the structural support members within the interior of the pallet must be removed thereby reducing the load bearing capacity of the pallet.

Further, in using pallets it is frequency necessary to store the empty pallets before or after use. The pallets are normally stored in a warehouse, a dock or other similar area where space is at a premium. Therefore, in order to conserve floor space and increase the capacity of the storage area, it is frequently necessary to vertically stack the empty pallets. When the pallets are vertically stacked, problems of stability may occur if the physical design of the pallets is not inherently stable and the pallets are randomly stacked on top of each other. Further, unless some method of preventing lateral movement between individual pallets is adopted, the stacked pallets may be unstable and if bumped, subjected to a horizontal force or stacked too high, may tip or fall over. Thus, under these circumstances unless lateral movement of the stacked pallets can be prevented, the usefulness of the pallets may be limited to applications where there is no requirement for vertical stacking of the empty pallets.

It is therefore an object of this invention to provide a pallet of increased strength adapted to be used with both fork lift and pallet trucks and suitable for secure vertical stacking when empty.

It is a further object of this invention to provide a plastic pallet with integrally molded stacking and nesting means adapted to prevent lateral movement of the pallets when the empty pallets are vertically stacked.

It is a further object of this invention to provide a plastic pallet of increased strength with adequate internal passages for use with both pallet and fork lift trucks and adapted to permit interlocking of the vertical pallets to prevent lateral movement when the empty pallets are vertically stacked.

SUMMARY OF THE INVENTION

According to the present invention, the objects of the invention are achieved and the disadvantages of the prior art are overcome by constructing a pallet comprised of a pair of generally planar load bearing surfaces disposed in spaced parallel opposed relationship to another. While these surfaces provide the necessary support surface for the material stored on the pallet, it is also necessary to provide passages between the two surfaces for pallet and fork lift trucks. This requires two openings on each of the four sides of the pallet with a passage through the pallet connecting the openings on one side with those on the opposite side. In order to provide rigidity and structural support, however, the two surfaces are spaced apart by reinforcing columnar portions located at positions therein. In this manner a rigid durable pallet is formed permitting use with pallet and fork lift trucks. In order, however, to permit the vertical stacking of empty pallets, protuberances and recesses are molded on the surfaces of the columnar portions at corresponding positions on the upper and lower surfaces. These protuberances may take any desired form such as elongated ridges, polygonals, or other geometric forms. By constructing the pallet in this manner, the interlocking relationship of a plurality of such pallets can be obtained by placing the pallets in a vertical stack with the lateral displacement of adjacent pallets prevented.

DESCRIPTION OF THE PREFERRED EMBODIMENT

Figure 1:
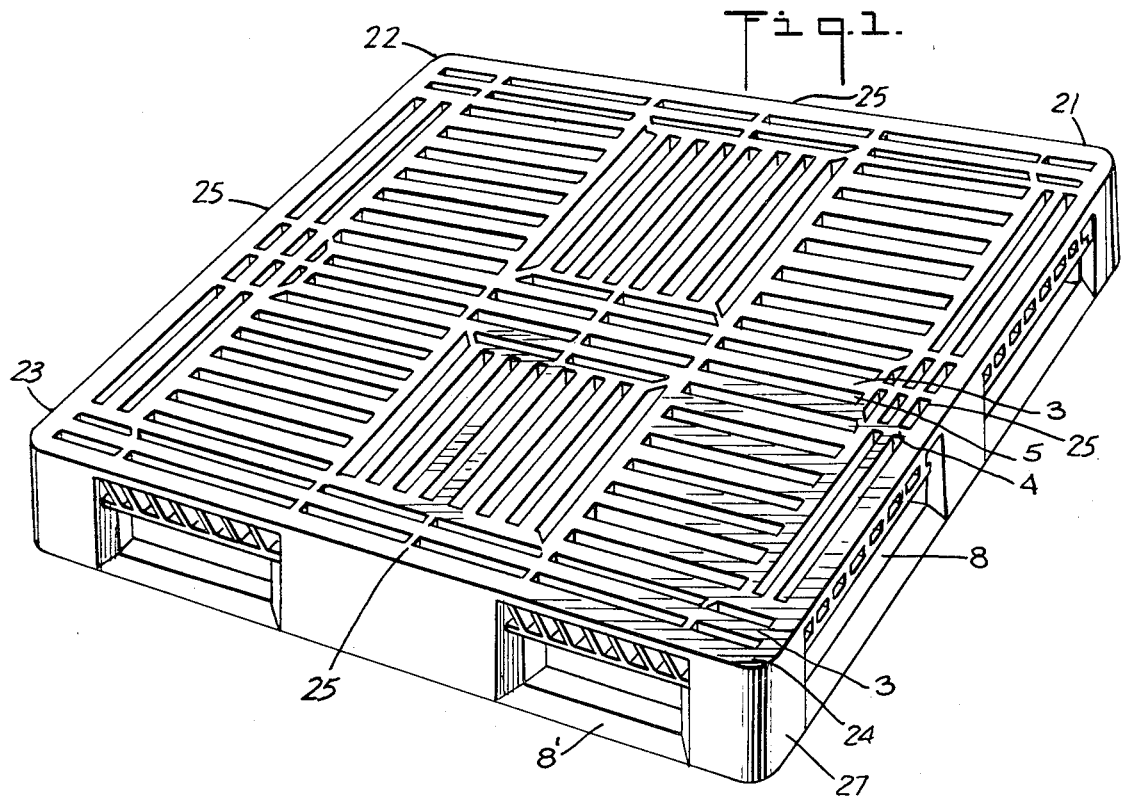
FIG. 1 is a perspective view of the top of the pallet illustrating the construction of the octagonal support member, upper surface, the reinforcing columnar portions, and the side openings for both pallet and fork lift trucks.
Figure 2:
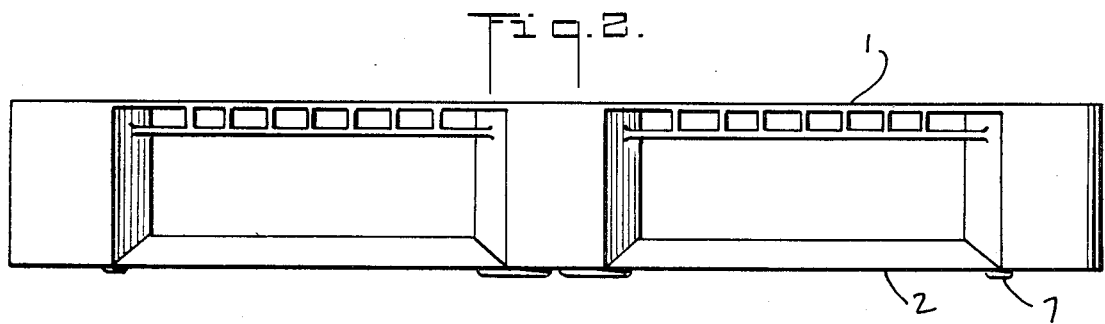
FIG. 2 is a side view of the pallet illustrating the tapered construction of the openings for the fork lift trucks and the protuberances on the lower surface of the pallet.
Figure 4:
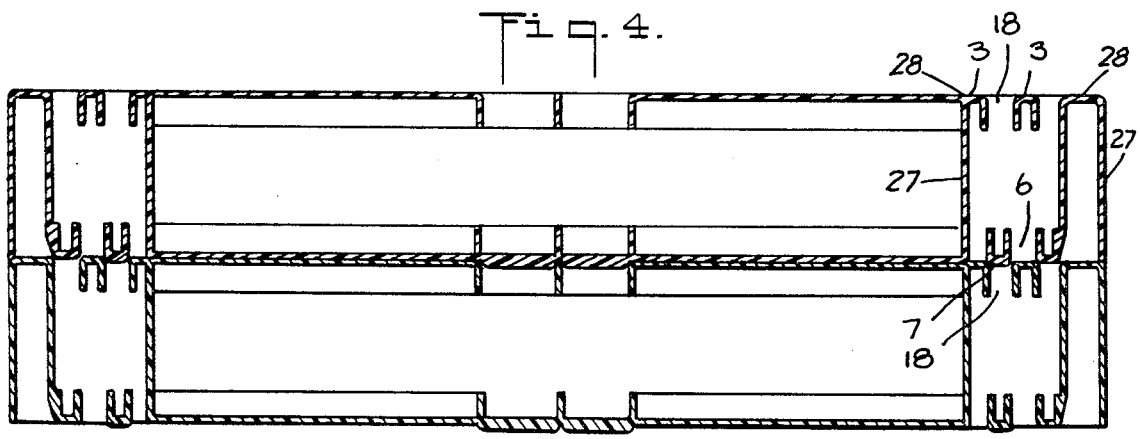
FIG. 4 is a cross-sectional view of the pallet taken along lines 4—4 of FIG. 3 illustrating the interlocking of the vertically stacked pallets constructed in accordance with this invention.
Figure 3:
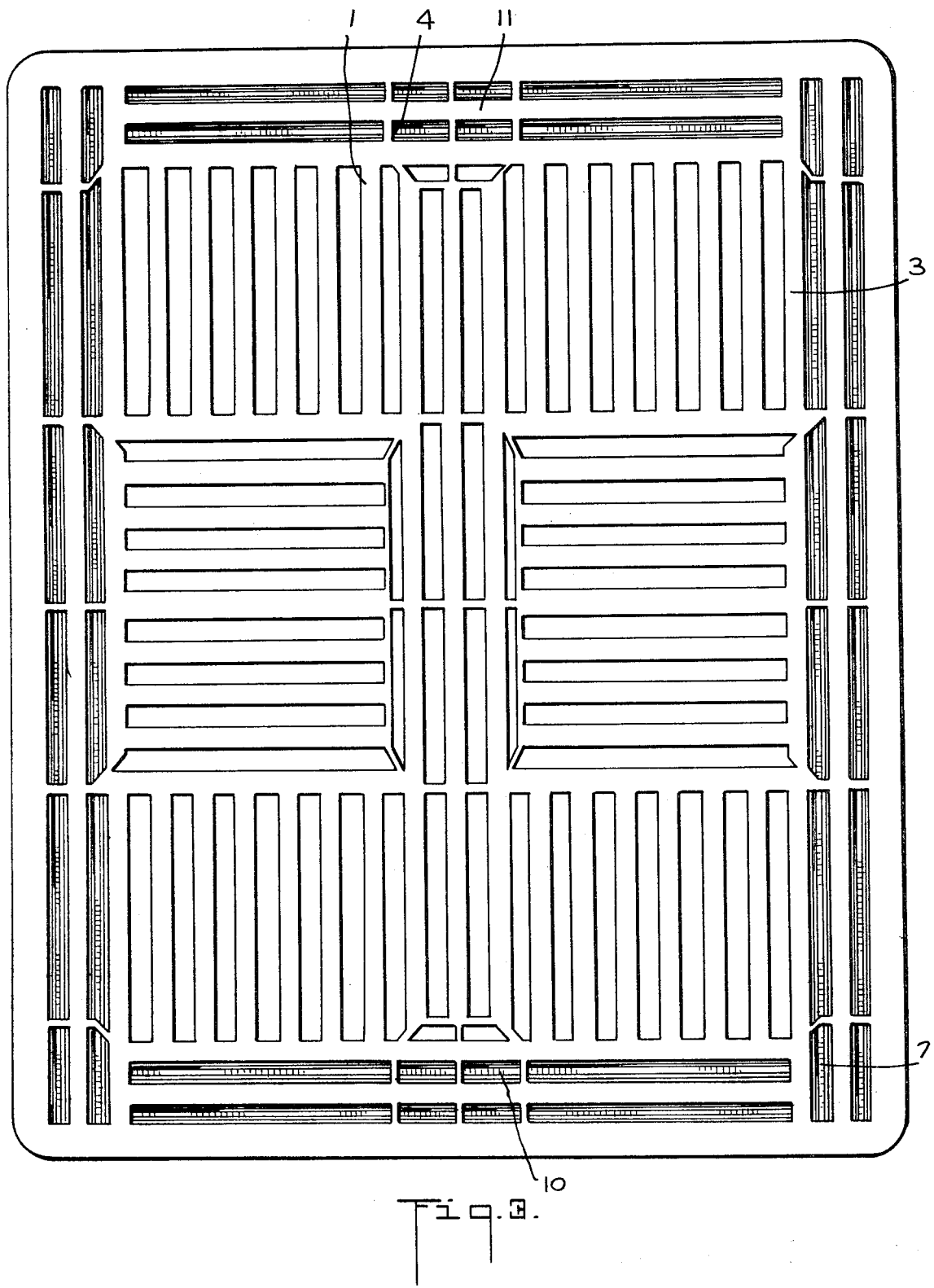
FIG. 3 is a top plan view illustrating in detail the construction of the upper surface of the pallets and the location of the protuberances on the lower surface of the pallet.

Referring now to the Figures, FIGS. 1 and 3 illustrate a preferred embodiment of my invention. These Figures show the general construction of the pallet described and claimed in my copending application, Ser. No. 191,932, filed Oct. 22, 1971, entitled "A Plastic Pallet and Its Method of Manufacture," the specification of which is incorporated herein by reference. As described therein the upper and lower surfaces of the pallet 1 and 2, respectively, in FIGS. 2, 3 and 4, are formed from a plurality of channel shaped ribs 3 arranged in various parallel configurations. These two surfaces thereby form a pair of generally planar load bearing surfaces, which are spaced apart in parallel opposed relationship to one another. In order to provide structural support for the surfaces and also to provide for the required internal passages for the pallet and means on the other of said surfaces to provide interlocking of a plurality of such pallets in stacked relation wherein lateral relative displacement of adjacent pallets is prevented.

4. A pallet as set forth in claim 1 wherein each said reinforcing columnar portion is comprised of at least two substantially vertical members (27) mounted between the pair of generally planar load bearing surfaces (1) and (2) and the protuberance means is comprised of at least one channel shaped rib (7) disposed between the sides of said reinforcing columnar portion on one of said surfaces and said recess means is a channel shaped indentation (18) disposed at a corresponding position on the opposite surface of the pallet.

5. An integrally molded plastic rectangular pallet as set forth in claim 1 wherein the reinforcing columnar portions are located respectively at the corners of the pallet, at intermediate locations (10) and (11) along the sides, said portions comprised of at least four parallel connected generally vertical walls (27), perpendicular to the planar load bearing surfaces, and separating said two surfaces, said portions having a plurality of parallel channel shaped ribs (3) spanning the area between the vertical walls on the upper and lower surfaces of said pallet, the ribs on the upper and lower surfaces being horizontally displaced relative to each other,
   at least one of said ribs (7) on the lower surface projecting beyond the plane of said surface to form the protuberance means,
   whereby the combination of the protuberances on the lower surface and the horizontal displacement of the ribs on the upper and lower surface permits vertical nesting of the protuberances within the space between the ribs on the upper surface when the pallets are vertically stacked.

6. A pallet as set forth in claim 4 wherein the recess means comprises an open portion between at least two channel shaped ribs on said upper surface, said ribs being disposed inwardly between the sides of said reinforcing columnar portion.

7. A pallet as set forth in claim 3 wherein said protuberance means are comprised of an elongated ridge.

8. A pallet as set forth in claim 1 wherein the protuberance means are polygonal.

9. A pallet as set forth in claim 1 wherein the protuberance means are cruciform.

10. A pallet as set forth in claim 1 wherein the protuberance means are circular.

11. A pallet as set forth in claim 1 wherein the protuberance means are rectangular.

12. A pallet as set forth in claim 1 wherein the protuberance means are square.

13. A pallet as set forth in claim 1 wherein the load bearing surfaces are substantially rectangular, the reinforcing columnar portions are located at the corners of the pallet, the protuberance means are located at the corners of the pallet on the lower surface and the recess means are located at the corners of the pallet on the top surface thereof.

14. A pallet as set forth in claim 13 further comprising additional reinforcing columnar portions at intermediate locations 10 and 11 along the sides of said pallet and having protuberances and recesses on at least two of said additional columnar portions.

* * * * *

UNITED STATES PATENT OFFICE
CERTIFICATE OF CORRECTION

Patent No. 3,750,596            Dated August 7, 1973

Inventor(s) Theodor M. Box

It is certified that error appears in the above-identified patent and that said Letters Patent are hereby corrected as shown below:

In the grant (Only) insert columns 3 and 4, as shown on the attached sheet.

Signed and sealed this 24th day of September 1974.

(SEAL)
Attest:

McCOY M. GIBSON JR.
Attesting Officer

C. MARSHALL DANN
Commissioner of Patents fork lift trucks, reinforcing columnar portions 4 are located at spaced locations on the upper and lower surfaces. These columnar portions 4 separate the two load bearing surfaces, join and thereby support the two surfaces and permit access to the interior of the pallets by pallet and fork lift trucks. In the embodiment depicted in the Figs. the columnar portions are located at the four corners 21, 22, 23, and 24 of the upper and lower surface and at the intermediate point 25 in the sides and ends of the surface. By arranging the columns in this fashion, the passages 8 and 8' are formed between the support surfaces and permit the entry of the lifting apparatus for fork lift and pallet trucks.

In the particular configuration depicted in the drawing, the reinforcing columns are shown as nine octagonally shaped portions or support members. These support members join the load bearing surfaces 1 and 2 and are formed from at least four generally vertical, unitary walls or vertical members 27 perpendicular to the planar load bearing surfaces 1 and 2. The support members separate the two surfaces. The unitary walls 27 have a channel shaped rib 28 on at least one end of each wall, with a plurality of parallel channel shaped ribs 3 spanning the area between the unitary vertical walls 27 on the upper and lower surfaces of the pallet. The spanning ribs 3 are horizontally displaced relative to each other, while the columnar reinforcing portions 4 have protuberance means 7 and recess means 18 on the surface at corresponding positions to provide interlocking of a plurality of such pallets in the stacked position to prevent the lateral displacement of adjacent pallets.

As illustrated in FIGS. 3 and 4, both the surfaces 1 and 2 are formed of ribs 3, the form of which may take any shape but as shown in this preferred embodiment are channel shaped. The ribs 3 are arranged on the surface with openings 5 between each rib. Additionally, the ribs 3 are so arranged that a rib on the upper surface of the pallet is directly above an opening on the lower surface and vice versa. This is shown in FIG. 4 where rib 3 on the upper surface is directly above the opening 6 in the lower surface.

To provide for the interlocking of the pallets constructed in accordance with this invention, the lower surface of the pallet has integrally molded into the lower surfaces protuberances or channel shaped ribs 7 which extend below the lower surface of the pallet. This can be clearly seen in FIGS. 2 and 4. In order to allow for the protuberances to lie flush when the pallets are vertically stacked, recess means 18 are integrally molded into the upper surface at the corresponding position of the protuberances 7. As shown in FIGS. 3 and 4, the recesses 18 can be formed between the two ribs 3 on the upper surface to permit interlocking of the pallets when the pallets are vertically stacked. This combination of the protuberances and the recesses prevents lateral displacement of adjacent pallets in a vertical stack. As shown in FIG. 4 which depicts the vertical assemblage of two pallets constructed in accordance with this invention, the lower surface of the pallet lies flush with the upper surface of the adjacent pallet while the protuberances 7 extend below the bottom surface of the pallet and are adapted to fit within correspondingly dimensioned and positioned recesses 18 integrally molded into the top surface of the adjacent pallet. This permits the vertical stacking and interlocking of the pallets when the upper surface of the pallet and the lower surface of the pallet adjacent to it lie flush.

I have also found that by including a first set of protuberances and recesses at the corners of the pallet and an optional second set at the intermediate points 10 and 11, added rigidity and stability against lateral movement can be provided. Further, as illustrated in the Figs. when the protuberances at the intermediate points 10 and 11 are angularly displaced with respect to the protuberances at the four corners of the pallet, further added stability and rigidity for the vertically stacked pallets is obtained.

As shown in the Figures, the protuberances and the recesses are generally channel shaped or elongated ridges. It is to be understood, however, that the shape of the protuberances can take on any form such as polygonal, square, cruciform, or circular.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. An integrally molded plastic pallet comprising a pair of generally planar load bearing surfaces (1) and (2), disposed in spaced parallel opposed relationship to one another, the surfaces comprised of a plurality of parallel rib members (3), spanning the area between the outer edges of the pallet on the upper and lower surfaces of the pallet, the ribs (3) on the upper and lower surfaces being horizontally displaced relative to each other, a plurality of reinforcing columnar portions (4) located at spaced positions on the surface of the pallet and joining the load bearing surfaces, the portions comprised of at least four generally vertical unitary walls (27), perpendicular to the planar load bearing surfaces and separating the two surfaces, the unitary walls each having a channel shaped rib (28) on at least one end of each wall and a plurality of parallel channel shaped ribs (3) spanning the area between the unitary vertical walls (27) on the upper and lower surfaces of the pallet, the spanning ribs (3) being horizontally displaced relative to each other, and the columnar reinforcing portions (4) having protuberance means (7) and recess means (18) on the surfaces at corresponding positions to provide interlocking of a plurality of such pallets in stacked relation wherein lateral relative displacement of adjacent pallets is prevented.

2. An integrally molded plastic pallet as in claim 1 wherein the columnar portions (4) have protuberance means (7) on one of said surfaces and corresponding dimensioned recess means (18) on the other of said surfaces to provide interlocking of a plurality of such pallets in stacked relation wherein lateral relative displacement of adjacent pallets is prevented.

3. An integrally molded plastic pallet as in claim 1 wherein the columnar portions have a first and second set of protuberance means on one of said surfaces, the first set of protuberances being at an angular relation to said second set, corresponding dimensioned recess